United States Patent [19]
Gras

[11] Patent Number: 4,879,356
[45] Date of Patent: Nov. 7, 1989

[54] METHOD OF MANUFACTURING SINGLE-COMPONENT POLYURETHANE BAKING ENAMELS

[75] Inventor: Rainer Gras, Bochum, Fed. Rep. of Germany

[73] Assignee: Huels Aktiengesellschaft, Marl, Fed. Rep. of Germany

[21] Appl. No.: 242,303

[22] Filed: Sep. 9, 1988

[30] Foreign Application Priority Data

Nov. 21, 1987 [DE] Fed. Rep. of Germany ....... 3739478

[51] Int. Cl.$^4$ .................. C08L 75/05; C08L 75/04
[52] U.S. Cl. ................................ 525/440; 524/590; 524/871; 524/873; 528/45
[58] Field of Search .................... 524/590, 871, 873; 525/440; 528/45

[56] References Cited

U.S. PATENT DOCUMENTS

| | | | |
|---|---|---|---|
| 4,151,152 | 4/1979 | Schmitt et al. | 524/873 |
| 4,383,076 | 5/1983 | Wolf et al. | 524/550 |
| 4,409,340 | 10/1983 | Stolzenbach et al. | 524/590 |
| 4,430,474 | 2/1984 | Schnurbusch et al. | 524/590 |
| 4,649,067 | 3/1987 | Gras | 524/505 |

Primary Examiner—Lewis T. Jacobs
Attorney, Agent, or Firm—Oblon, Spivak, McClelland, Maier & Neustadt

[57] ABSTRACT

A method of manufacturing a single-component PUR baking enamel comprising preparing a binder which is the reaction product of a partially blocked polyisocyanate (A) having a free NCO content >10 wt % and a total NCO content of 21-37 wt. % and a hydroxyl group-containing polyhydroxy compound having more than two hydroxy groups per molecule, and combining the reaction product with baking enamel additives in a solvent employable for baking enamels.

18 Claims, No Drawings

METHOD OF MANUFACTURING SINGLE-COMPONENT POLYURETHANE BAKING ENAMELS

BACKGROUND OF THE INVENTION

1. Field of the Invention

The invention relates to solvent-containing single-component polyurethane (PUR) baking enamels comprised of polyisocyanates partially blocked with blocking agents and hydroxyl-group-containing polyesters based primarily on aromatic dicarboxylic acids, diols, and triols, and further possibly containing customary additives.

2. Description of the Background

In order to prepare mixtures of polyisocyanate and polyhydroxy compounds, which mixtures are maintainable at room temperature, one employs polyisocyanates, the reactive groups of which are blocked with monofunctional compounds. The polyisocyanates are generally referred to as "capped" or "blocked" polyisocyanates. Such products are described, e.g., in 1949 Annalen, Vol. 562, pp. 205–229.

Under the influence of relatively high temperatures, the blocking groups cleave thereby liberating the starting polyisocyanate compounds. The newly unblocked isocyanate groups can then react with the hydroxyl groups present in the reaction mixture, with the formation of a product film.

If these mixtures of blocked polyisocyanates and polyhydroxy compounds are to be employed for coating objects in injection molding and casting processes, or for coating metal plates by roll-coating, particularly in "coil coating" processes, the crosslinking agent as well as the resin must be soluble in the usual enamel solvents and must be storage-stabile.

With few exceptions, aliphatic polyisocyanates blocked with epsilon-caprolactum and/or ketoximes are incompatible with the usual enamel solvents (Ger. AS 23 46 818, col. 2, Line 18). Therefore, the aliphatic polyisocyanates are not acceptable starting components for the preparation of single-component PUR baking enamels.

German AS 23 46 818, in col. 2, line 45 describes that it is advantageous to leave free isocyanate groups in the amount of 0.01–5 wt.% in the blocked isocyanate adduct. In German OS 33 22 722 up to 10 wt.%, preferably up to 5 wt.%, of free isocyanate groups remain in the blocked isocyanate adduct. This upper limit of free isocyanate groups in a blocked isocyanate adduct has not heretofore been exceeded, because of the need to control viscosity and to avoid the tendency to gelify, i.e. on grounds of ensuring the processibility of the single-component PUR baking enamels. The maximum possible content of free isocyanate groups is favored, for a number of reasons, including ecological, economic, and storage stability reasons. The binder components have excellent compatibility in enamel solvents.

A need therefore continues to exist for a single-component PUR baking enamel which is prepared from a partially blocked polyisocyanate in which the content of free isocyanate groups is greater than that which has been customary for partially blocked polyisocyanates.

SUMMARY OF THE INVENTION

Accordingly, one object of the present invention is to provide a single-component PUR baking enamel which is prepared from a blocked polyisocyanate reactant of greater free NCO content than is customary for partially blocked polyisocyanates.

Another object of the present invention is to provide a sample component PUR baking enamel which is ecologically more acceptable and economic to produce, as well as having good storage stability.

Briefly, these objects and other objects of the present invention as hereinafter will become more readily apparent can be attained in a method of producing single-component PUR baking enamels by preparing a binder which is the reaction product of a partially blocked polyisocyanate (A) having a free NCO content >10 wt.% and a total NCO content of 21–37 wt.% and a hydroxyl group-containing polyhydroxyl compound having more than two hydroxy groups per molecule; and combining the reaction product with baking enamel additives in a solvent employable for baking enamels.

DETAILED DESCRIPTION OF THE PREFERRED EMBODIMENTS

The technique of the present invention offers significantly favorable economic and ecological effects:

(a) The amount of released blocking agent is reduced in comparison to the situation of single-component PUR baking enamels known to the state of the art.

(b) The amount of crosslinking agent, based on an identical hydroxyl number of the polyhydroxy compound and an identical ratio of NCO to OH needed for producing the stock solution for the enamel can be reduced in comparison to the amounts required in conventional enamels.

(c) The chance of formation of the un-blocked polyisocyanate during the curing process is substantially eliminated in comparison to what happens in conventional enamels.

(d) The weight of the dry film on the coated substrate is increased.

Heretofore it has not been possible to produce single-conponent PUR baking enamels which have practical processing viscosities if the partially blocked polyisocyanate adducts are prepared by the reaction:

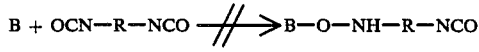

wherein B is the blocking agent. In the reaction of one mole of blocking agent with one mole of disocyanate, completely blocked polyisocyanate is formed and 15–17 wt.% of the polyisocyanate is not converted, i.e. remains un-blocked polyisocyanate. This high content of unblocked polyisocyanate is such a major drawback that the technique cannot be used feasibly to prepare single-component PUR baking enamels of the type known in the art.

Surprisingly, it has been found possible, in the present invention, to manufacture single-component PUR baking enamels based on partially blocked polyisocyanates having a free isocyanate content in the blocked polyisocyanate adduct of >10 wt.% and a content of un-blocked polyisocyanate of ≦3.5 wt.%, preferably ≦2.5 wt.%, and particularly preferably ≦1 wt.%, in combination with hydroxyl-group-containing polyhydroxy compounds containing more than two OH groups per molecule.

The preparation of the partially blocked polyisocyanate component of the composition is the subject of a separate patent application bearing Ser. No. 07/243,605, filed Sept. 13, 1988. In the method, the polyisocyanate is reacted with the blocking agent, with the polyisocyanate being present in substantial excess at a mole ratio of from 5:1 to 20:1, at 50°–130° C., preferably 70°–100° C., following which the excess polyisocyanate is separated by thin layer evaporation. In this connection, the polyisocyanate should have a boiling point in vacuo which is below the de-blocking temperature of the blocking agent employed.

An important aspect of the present invention is the method employed for manufacturing single-component PUR baking enamels based on hydroxyl-group-containing polyhydroxy compounds and polyisocyanate adducts, and containing the customary additives, and the typical solvents employed for enamels, wherein the polyisocyanate adduct is a partially blocked polyisocyanates (A) which has a free NCO content >10 wt.% and an overall NCO content of 21–37 wt.% which is reacted with a hydroxyl-group-containing polyhydroxy compound (B) having more than two OH groups in the molecule.

The partially blocked polyisocyanates of the present invention may, as a rule, preferably be prepared from readily available polyisocyanates which include aliphatic, (cyclo)aliphatic, and aromatic polyisocyanates, e.g. 1,6-hexanediisocyanate ("HDI"), 2-methyl-1,5-pentanediisocyanate ("DI51"), 2,2,4- and/or 2,4,4-trimethyl-1,6-hexanediisocyanate ("TMDI"), and 2,4- and/or 2,6-toluenediisocyanate ("TDI"). Particularly preferred is 3-isocyanatomethyl-3,5,5-trimethylcyclohexylisocyanate (isophoronediisocyanate, "IPDI") and mixtures of isomers thereof.

Suitable blocking agents which are liberated at the curing temperatures, for blocking the polyisocyanate, include alcohols such as methanol, ethanol, isopropanol, and cyclohexanol, oximes such as acetoneoxime, methyl isobutyl ketoxime, and diisobutyl ketoxime, mercaptans, lactams such as lauryllactam, sterically hindered secondary amines such as diisopropylamine and dicyclohexylamine, acetoacetic esters, malonic acid esters, and particularly epsilon-caprolactam and methyl ethyl ketoxime ("MEK-ox."). (See 1963 Houben-Weyl "Methoden der organischen Chemie", Vol. 14/2, 4th Ed, pub. Georg Thieme Verla, Stuttgart, pp. 61 ff.)

Mixtures of the partially blocked polyisocyanates may also be used as crosslinking agents for the hydroxyl-group-containing polyhydroxy compounds component in the manufacture of single-component PUR baking enamels of the invention.

The hydroxyl-group-containing polyhydroxy compound components are preferably saturated polyesters based on aliphatic and aromatic polycarboxylic acids, diols, and triols, having hydroxyl numbers of 40–500 mg KOH/g, preferably 80–330 mg KOH/g, and molecular weights of 400–4,500, preferably 500–2,000, and glass transition temperatures below +20° C. Essential components of the polyesters are:

Cyclic polycarboxylic acids and their esters and anhydrides, for example, phthalic acid, isophthalic acid, terephthalic acid, benzenetricarboxylic acids, trimellitic acid anhydride, dimethyl terephthalate ("DMT"), and hydrogenation products thereof;

Diols such as ethylene glycol, 1,2- or 1,3-propanediol, 1,2- or 1,3- or 1,4-butanediol, 1,5-pentanediol, 2-methyl-1,5-pentanediol, 1,6-hexanediol, cyclohexanediol, 2,2-di(4'-hydroxy)cyclohexylpropane, 1,4-dihydroxymethylcyclohexane, diethylene glycol, triethylene glycol, hydroxypivalinic acid neopentyl glycol ester, and neopentyl glycol;

Polyols such as glycerin, hexanetriol, 1,1,1-tri(hydroxymethyl)propane ("trimethylolpropane"), 1,1,1-tri(hydroxymethyl)ethane, and pentaerythritol.

Other acids which contribute to polyester formation in full or partial measure include cyclic polycarboxylic acids such as adipic acid, 2,2,4- and/or 2,4,4-trimethyladipic acid, sebacic acid, suberic acid, and dodecanedicarboxylic acid. The polyesters may also be prepared from monofunctional carboxylic acids such as benzoic acid in partial measure.

Mono- and polyesters derived from lactones such as epsilon-caprolactam and valerolactone or from hydroxycarboxylic acids such as hydroxypivalic acid, omega-hydroxydecanoic acid, omega-hydroxyhexanoic acid, and thioglycolic acid may be used. Further, polyesters derived from the above-mentioned polycarboxylic acids or their derivatives and polyphenols such as hydroquinone, bisphenol A, or bis(4-hydroxyphenyl)sulfone as well as polyesters of carboxylic acids prepared from hydroquinone, bis(hydroxyphenyl)propane, p-xylylene glycol, ethylene glycol, butanediol, hexanediol, and other polyols by means of standard condensation reactions, with the likes of phosgene, diethyl carbonate, or diphenyl carbonate. Other polyesters are those obtained from cyclic carbonates such as ethylene glycol carbonate or vinylidene carbonate by polymerization in known fashion.

The polyesters may be prepared by methods which are per se known, namely condensation or transesterification, possibly in the presence of the usual catalysts in an inert gas atmosphere, at 100°–260° C., preferably 130°–230° C., in a melt or by azeotropic distillation, e.g. as described in 1963 Houben-Weyl, ibid., pp 1–5, 21–23, and 40–44, or in Marten, C. R., 1961, "Alkyd resins", Reinhold Plastics Appl. Series, pub. Reinhold Publishing Co., New York, pp 51–99.

Also, hydroxyl group-containing acrylate resins, PURs, and/or polyureas may be used.

In the manufacture of a single-component PUR baking enamel, binder components A and B are dissolved in the usual enamel solvents. The mixing ratio of the binder components may be varied within wide limits. The best coating parameters are achieved if the binder mixture is comprised of 50–90 wt.% polyester and 50–10 wt.% crosslinking agent, wherewith the OH/NCO ratio may vary from 1:06 to 1:1.2, preferably 1:0.8 to 1:1.1. It is particularly preferred to use one equivalent of NCO of the crosslinking agent per OH equivalent of the polyhydroxy compound. The concentration of the mixture of polyester resin and crosslinking agent (hardener), which mixture constitutes the binder, in the solvent is between 40 and 80 wt.%.

Suitable solvents for the present single-component baking enamels have a minimum boiling point of about 100° C. The upper limit of the boiling point of the solvent depends on the specific baking conditions. If baking is carried out at relatively high temperatures, the boiling points of the solvents used must also be relatively high. Specific solvent materials include, among others, the following:

hydrocarbons such as toluene, xylene; Solvesso ® 100, 150, and 200, which are aromatic compound mixtures sold by Esso; tetralin, and decalin;

esters such as butyl acetate, n-hexyl acetate, hydroxyethyl acetate ethylene glycol acetate, ("EGA"), hydroxybutyl acetate, methoxypropyl acetate ("MOP-A"), and the like; and ketones such as methyl isobutyl ketone, diisobutyl ketone, and isophorone.

For the preparation of a single-component PUR baking enamel within the scope of the invention, the binder components A and B, dissolved in the usual enamel solvents are reacted at 50°-100° C., preferably between 60° and 80° C., possibly in the presence of catalysts normally used in the PUR chemistry. The enamel solution is heated until the NCO content decreases to zero.

Following complete reaction of the OH and NCO groups, the customary additives may be added to the enamel solution which include pigments, colorants, fillers, leveling agents, gloss agents, defoamers, wetting agents, and stabilizers. These additives are ground in sand mills or driven ball mills.

The single-component PUR baking enamels are particularly suited for application to metal surfaces, but are also well suited for application to other materials such as glass or plastic. The present enamels are particularly useful in coil coating techniques for producing weather-resistant single-coat and two-coat enamels.

Depending on the particular use situation, the enamels are cured at 130°-350° C., preferably between 140° and 300° C., with curing times of 30 min to 30 sec. The enamel films have outstanding coating parameters, in particular high flexibility and weather-resistance.

Having now generally described this invention, a further understanding can be obtained by reference to certain specific examples which are provided herein for purposes of illustration only and are not intended to be limiting unless otherwise specified.

A. PREPARATION OF THE PARTIALLY BLOCKED POLYISOCYANATES

GENERAL METHOD OF PREPARATION

A 1 mole amount of blocking agent is added portionwise to 5-20 mole of polyisocyanate at 70°-80° C. with stirring. After completion of the addition of the blocking agent, the reaction mixture is heated at 100° C. for an additional hour, following which the unconverted polyisocyanate is removed by thin layer evaporation at 90°-140° C. and 0.0133 mbar. Chemical and physical data on the reaction products (the residue of evaporation) obtained are given in Table 1.

B. POLYOL COMPONENT

EXAMPLE B1

In a 4-liter glass flask, 7 mol (1162 parts by wt.) isophthalic acid, 2 mol (268 parts by wt.) trimethylolpropane, 4 mol (472 parts by wt.) 1,6-hexanediol, and 2 mol (320 parts by wt.), 2,2,4- and/or 2,4,4-trimethyl-1,6-hexanediol were charged for esterification. Di-n-butyltin oxide in the amount of 0.05 wt.% was used as the esterification catalyst. Water was first given off at c. 150° C. In about 6-8 hr the temperature was increased to 220° C. The esterification was concluded in about 6 hours. Then the polyester was cooled to 200° C., and volatile components were substantially completely removed by application of vacuum (15-30 torr) for 30-45 min. During the entire reaction, a gentle stream of nitrogen was passed through the reaction mixture.

Physical and chemical parameters:

| | |
|---|---|
| OH number | 100–110 mg KOH/g |
| Acid number | <2 mg KOH/g |
| Glass temperature (determined by DTA) | +1 to +8° C. |

The drainage times of 60 wt.% solutions, determined with a DIN 4 beaker at 20° C., were (solvent designations as given supra): ("a") 300 sec; ("b") 335 sec; ("c") 740 sec; ("d") 395 sec; ("e") 459 sec; ("f") 850 sec; ("g") 430 sec.

EXAMPLE B2

7 mol (1162 parts by wt.) isophthalic acid, 2 mol (268 parts by wt.) trimethylolpropane, and 6 mol (708 parts by wt.) hexanediol were esterified according to the method of Example B1, until the acid number was <2 mg.

Physical and chemical parameters:

| | |
|---|---|
| OH number | 100–110 mg KOH/g |
| Acid number | <2 mg KOH/g |
| Glass temperature (determined by DTA) | +4 to +12° C. |

The drainage times of 60 wt.% solutions, determined with a DIN 4 beaker at 20° C., were (solvent designations as given supra): (a) 525 sec; (b) 580 sec; (c) 1133 sec; (d) 645 sec; (e) 705 sec; (f) 1251 sec; (g) 595 sec.

TABLE 1

| | Starting Material | | | | Polyisocyanate | | | | | |
|---|---|---|---|---|---|---|---|---|---|---|
| | Polyiso- | Blocking | NCO-Content in wt. % | | monomer | Viscosity in mPa.s at °C. | | | | |
| Example | cyanate | Agent | free | total | wt % | 25° C. | 30° C. | 40° C. | 50° C. | 70° C. |
| A1 | IPDI | Caprol. | 12 | 24.4 | 0.5 | 975000 | 342000 | 16500 | 10500 | 820 |
| A2 | IPDI | Caprol. | 11.6 | 24.7 | 1.1 | 1250000 | 410000 | 63500 | 13700 | 1250 |
| A3 | IPDI | Caprol. | 11.5 | 24.5 | 2.2 | 1145000 | 397000 | 61250 | 12530 | 1070 |
| A4 | IPDI | MEK-ox. | 12.8 | 26.5 | 2.8 | 571000 | 152000 | 27500 | 5500 | 420 |
| A5 | HDI | Caprol. | 15.3 | 29.4 | 0.5 | 100 | 80 | 50 | 30 | <30 |
| A6 | HDI | MEK-ox | 15.8 | 32.4 | 2.5 | 70 | 60 | 50 | 30 | <30 |
| A7 | DI51 | Caprol. | 14.8 | 29.3 | 0.7 | 160 | 120 | 60 | 45 | <30 |
| A8 | DI51 | MEK-ox. | 15.7 | 31.5 | 0.8 | 190 | 150 | 80 | 60 | 30 |

For manufacturing the single-component PUR baking enamels, the partially blocked polyisocyanates were dissolved in the following enamel solvent combinations, and the drainage times of 60% solutions in a DIN 4 beaker were determined. These times were between 7 and 23 sec.
(a) n-Butyl acetate/xylene=1:3;
(b) EGA/Solveso(R) 100=1:2;
(c) EGA/Solveso(R) 150=1:2;
(d) EGA/xylene/Solvesso(R) 100=1:1:1;
(e) MOP-A/Solvesso(R) 100=1:2;
(f) MOP-A/Solvesso(R) 150=1:2;
(g) MOP-A/xylene/Solvesso(R) 100=1:1:1.

EXAMPLE B3

7 mol (1162 parts by wt.) isophthalic acid, 2 mol (268 parts by wt.) trimethylolpropane, 4 mol (472 parts by wt.) 1,6-hexanediol, and 2 mol (408 parts by wt.) hydroxypivalic acid neopentyl glycol ester were esterified according to the method of Example B1, until the acid number was <2 mg.

Physical and chemical parameters:

| OH number | 90–106 mg KOH/g |
|---|---|
| Acid number | <2 mg KOH/g |
| Glass temperature (determined by DTA) | +0 to +10° C. |

The drainage times of 60 wt.% solutions, determined with a DIN 4 beaker at 20° C., were (solvent designations as given supra): (a) 219 sec; (b) 350 sec; (c) 652 sec; (d) 401 sec; (e) 464 sec; (f) 712 sec; (g) 457 sec.

EXAMPLE B4

7 mol (1162 parts by wt.) isophthalic acid, 2 mol (268 parts by wt.) trimethylolpropane, 3 mol (354 parts by wt.) 1,6-hexanediol, and 3 mol (612 parts by wt.) hydroxypivalic acid neopentyl glycol ester were esterified according to the method of Example B1, until the acid number was <2 mg.

Physical and chemical parameters:

| OH number | 85–102 mg KOH/g |
|---|---|
| Acid number | <2 mg KOH/g |
| Glass temperature (determined by DTA) | +2 to +11° C. |

The drainage times of 60 wt.% solutions, determined with a DIN 4 beaker at 20° C., were (solvent designations as given supra): (a) 253 sec; (b) 400 sec; (c) 751 sec; (d) 439 sec; (e) 497 sec; (f) 864 sec; (g) 477 sec.

EXAMPLE B5

7 mol (1162 parts by wt.) isophthalic acid, 2 mol (268 parts by wt.) trimethhlolpropane, 5 mol (590 parts by wt.) 1,6-hexanediol, and 1 mol (104 parts by wt.) neopentyl glycol were esterified according to the method of Example B1, until the acid number was <2 mg.

Physical and chemical parameters:

| OH number | 100–110 mg KOH/g |
|---|---|
| Acid number | <2 mg KOH/g |
| Glass temperature (determined by DTA) | +4 to +12° C. |

The drainage times of 60 wt.% solutions, determined with a DIN 4 beaker at 20° C., were (solvent designations as given supra): (a) 597 sec; (b) 643 sec; (c) 1205 sec; (d) 683 sec; (e) 721 sec; (f) 1301 sec; (g) 607 sec.

EXAMPLE B6

CAPA 305, a polycaprolactone supplied by the firm Interox:

Physical and chemical parameters:

| OH number | 310 mg KOH/g |
|---|---|
| Acid number | <0.75 mg KOH/g |
| Glass temperature (determined by DTA) | −67 to −60° C. |

The drainage times of 60 wt.% solutions, determined with a DIN 4 beaker at 20° C., were (solvent designations as given supra): (a) 17 sec; (b) 18 sec; (c) 18 sec; (d) 18 sec; (e) 18 sec; (f) 19 sec; (g) 18 sec.

EXAMPLE B7

CAPA 316, a polycaprolactone supplied by the firm Interox:

Physical and chemical parameters:

| OH number | 218 mg KOH/g |
|---|---|
| Acid number | <1 mg KOH/g |
| Glass temperature (determined by DTA) | −64 to −57° C. |

The drainage times of 60 wt.% solutions, determined with a DIN 4 beaker at 20° C., were (solvent designations as given supra): (a) 20 sec; (b) 21 sec; (c) 23 sec; (d) 21 sec; (e) 22 sec; (f) 24 sec; (g) 22 sec.

C. SINGLE-COMPONENT PUR BAKING ENAMELS

The 60 wt.% solutions of the partially blocked polyisocyanates and the 60 wt.% solutions of the polyesters are used to prepare the stock solutions for the enamels.

GENERAL PREPARATION

(A) STOCK SOLUTION FOR THE ENAMEL

The calculated amount (based on total NCO content) of partially blocked polyisocyanate solution is added to the polyester solution at 60°–80° C. with thorough stirring. After the addition of the polyisocyanate is completed, stirring at 80° C. is continued until the NCO content is reduced to zero.

(B) PIGMENTED ENAMEL SOLUTION

To the stock solution for the enamel, prepared according to the preceding paragraph (Ca), an additional 7 wt. % of the solvent mixture (corresponding to the stock solution) is added, and the resulting solution is charged to a driven ball mill, along with white pigment (TiO$_2$) and/or filler and/or colorant, a well as a leveling agent customarily used in PUR chemistry, and defoaming agents. Grinding is carried out in the mill.

The clear or pigmented enamel is applied to degreased and/or pretreated steel or aluminum sheet 0.8–1 mm thick. Curing is carried out in a laboratory circulating air drying cabinet. Curing temperatures are between 170° and 280° C. The layer thicknesses of the test films are between 25 and 30 micron.

EXAMPLE C1

Following the preparation of the stock solution according to (Ca) and subsequent pigmentation according to (Cb), the enamel is applied and is cured at a temperature between 170° and 280° C.

Formula (quantities are in wt.%)

| Polyester solution according to Example B1 | 47.2 |
|---|---|
| Crosslinking agent solution according to Example A1 | 15.3 |
| Solvent mixture as per the enamel solution used | 7.0 |
| White pigment (TiO$_2$) | 29.4 |
| Defoaming agent | 1.0 |
| Leveling agent | 0.1 |

TABLE 2

| Curing Conditions | Mechanical Data | | | | | | |
|---|---|---|---|---|---|---|---|
| Time/Temp min/°C. | HK$^a$ | HB$^b$ | ET$^c$ | T-Bend-Test | Pencil Lead Hardness | GS$^d$ | Gardner Gloss$^e$ | |
| | | | | | | | 20° ⦤ | 60° ⦤ |
| 2.25/280 | 196 | 125 | 7.9 | 0 | 2 H | 0 | 72 | 91 |

TABLE 2-continued

| Curing Conditions Time/Temp min/°C. | HK[a] | HB[b] | ET[c] | T-Bend-Test | Pencil Lead Hardness | GS[d] | Gardner Gloss[e] 20° ∢ | 60° ∢ |
|---|---|---|---|---|---|---|---|---|
| 3/250 | 199 | 125 | 8.0 | 0 | 2 H | 0 | 74 | 89 |
| 7/200 | 195 | 125 | 8.0 | 0 | 2 H | 0 | 76 | 88 |
| 10/180 | 192 | 111 | 8.0 | 0 | H-2 H | 0 | 77 | 88 |
| 14/170 | 190 | 125 | 8.1 | 0 | 2 H | 0 | 76 | 89 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C2

Following preparation of the stock solution according to (Ca) and subsequent pigmentation according to (Cb), the enamel is applied and is cured at a temperature between 170° and 280° C.

Formula (quantities are in wt.%):

| | |
|---|---|
| Polyester solution according to Example B1 | 47.8 |
| Crosslinking agent solution according to Example A1 | 14.7 |
| Solvent mixture as per the enamel solution used | 7.0 |
| White pigment (TiO₂) | 29.4 |
| Defoaming agent | 1.0 |
| Leveling agent | 0.1 |

TABLE 3

| Curing Conditions Time/Temp min/°C. | HK[a] | HB[b] | ET[c] | T-Bend-Test | Pencil Lead Hardness | GS[d] | Gardner Gloss[e] 20° ∢ | 60° ∢ |
|---|---|---|---|---|---|---|---|---|
| 2.25/280 | 197 | 125 | 7.8 | 0 | 2 H | 0 | 71 | 88 |
| 3/250 | 193 | 125 | 8.2 | 0 | 2 H | 0 | 75 | 86 |
| 7/200 | 196 | 125 | 8.3 | 0 | 2 H | 0 | 76 | 87 |
| 10/180 | 191 | 111 | 8.1 | 0 | 2 H | 0 | 77 | 89 |
| 14/170 | 190 | 111 | 8.0 | 0 | 2 H | 0 | 78 | 88 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C3

Following preparation of the stock solution according to (Ca) and subsequent pigmentation according to (Cb), the enamel was applied and cured at a temperature between 170° and 280° C.

Formula (quantities are in wt.%):

| | |
|---|---|
| Polyester solution according to Example B1 | 47.3 |
| Crosslinking agent solution according to Example A2 | 15.2 |
| Solvent mixture as per the enamel solution used | 7.0 |
| White pigment (TiO₂) | 29.4 |
| Defoaming agent | 1.0 |
| Leveling agent | 0.1 |

TABLE 4

| Curing Conditions Time/Temp min/°C. | HK[a] | HB[b] | ET[c] | T-Bend-Test | Pencil Lead Hardness | GS[d] | Gardner Gloss[e] 20° ∢ | 60° ∢ |
|---|---|---|---|---|---|---|---|---|
| 2.25/280 | 194 | 125 | 7.7 | 0 | 2 H | 0 | 74 | 88 |
| 3/250 | 197 | 125 | 7.9 | 0 | 2 H | 0 | 71 | 90 |
| 7/200 | 199 | 125 | 8.1 | 0 | 2 H | 0 | 77 | 87 |
| 10/180 | 196 | 125 | 8.0 | 0 | 2 H | 0 | 76 | 88 |
| 14/170 | 194 | 125 | 7.9 | 0 | 2 H | 0 | 74 | 89 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C4

Following preparation of the stock solution according to (Ca) and subsequent pigmentation according to (Cd), the enamel was applied and was cured at a temperature between 170° and 280° C.

Formula (quantities are in wt.%):

| | |
|---|---|
| Polyester solution according to Example B1 | 47.2 |
| Crosslinking agent solution according to Example A3 | 15.3 |
| Solvent mixture as per the enamel solution used | 7.0 |
| White pigment (TiO₂) | 29.4 |
| Defoaming agent | 1.0 |
| Leveling agent | 0.1 |

TABLE 5

| Curing Conditions Time/Temp min/°C. | HK[a] | HB[b] | ET[c] | T-Bend-Test | Pencil Lead Hardness | GS[d] | Gardner Gloss[e] 20° ≮ | 60° ≮ |
|---|---|---|---|---|---|---|---|---|
| 2.25/280 | 199 | 125 | 7.9 | 0 | 2 H | 0 | 72 | 91 |
| 3/250 | 195 | 125 | 7.9 | 0 | 2 H | 0 | 75 | 88 |
| 7/200 | 197 | 125 | 8.2 | 0 | 2 H | 0 | 77 | 89 |
| 10/180 | 192 | 125 | 8.1 | 0 | 2 H | 0 | 74 | 89 |
| 14/170 | 189 | 125 | 8.0 | 0 | 2 H | 0 | 76 | 91 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C5

Following preparation of the stock solution according to (Ca) and subsequent pigmentation according to (Cd), the enamel was applied and was cured at a temperature between 170° and 280° C.

Formula (quantities are in wt.%)

| | |
|---|---|
| Polyester solution according to Examples B1 and B6 (ratio 95:5 by wt.) | 45.8 |
| Crosslinking agent solution according to Example A1 | 16.7 |
| Solvent mixture as per the enamel solution used | 7.0 |
| White pigment (TiO$_2$) | 29.4 |
| Defoaming agent | 1.0 |
| Leveling agent | 0.1 |

TABLE 6

| Curing Conditions Time/Temp min/°C. | HK[a] | HB[b] | ET[c] | T-Bend-Test | Pencil Lead Hardness | GS[d] | Gardner Gloss[e] 20° ≮ | 60° ≮ |
|---|---|---|---|---|---|---|---|---|
| 2.25/280 | 189 | 125 | 8.3 | 0–1 | 2 H | 0 | 70 | 88 |
| 3/250 | 184 | 125 | 8.4 | 0 | 2 H | 0 | 72 | 86 |
| 7/200 | 186 | 125 | 8.1 | 0–1 | 2 H | 0 | 74 | 89 |
| 10/180 | 182 | 125 | 8.3 | 0–1 | 2 H | 0 | 72 | 89 |
| 14/170 | 184 | 125 | 8.2 | 0 | 2 H | 0 | 74 | 87 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C6

Following preparation of the stock solution according to (Ca) and subsequent pigmentation according to (Cd), the enamel was applied and was cured at a temperature between 170° and 280° C.

Formula (quantities are in wt.%):

| | |
|---|---|
| Polyester solution according to Examples B1 and B7 (ratio 90:10 by wt.) | 45.8 |
| Crosslinking agent solution according to Example A1 | 16.7 |
| Solvent mixture as per the enamel solution used | 7.0 |
| White pigment (TiO$_2$) | 29.4 |
| Defoaming agent | 1.0 |
| Leveling agent | 0.1 |

TABLE 7

| Curing Conditions Time/Temp min/°C. | HK[a] | HB[b] | ET[c] | T-Bend-Test | Pencil Lead Hardness | GS[d] | Gardner Gloss[e] 20° ≮ | 60° ≮ |
|---|---|---|---|---|---|---|---|---|
| 2.25/280 | 190 | 125 | 8.2 | 0 | 2 H | 0 | 70 | 87 |
| 3/250 | 192 | 125 | 8.5 | 0 | 2 H | 0 | 72 | 89 |
| 7/200 | 189 | 125 | 8.3 | 0 | 2 H | 0 | 71 | 86 |
| 10/180 | 188 | 125 | 8.2 | 0 | 2 H | 0 | 73 | 86 |
| 14/170 | 189 | 125 | 8.4 | 0 | 2 H | 0 | 72 | 88 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C7

Following preparation of the stock solution according to (Ca) and subsequent pigmentation according to (Cd), the enamel was applied and was cured at a temperature between 170° and 280° C.

Formula (quantities are in wt.%):

| | |
|---|---|
| Polyester solution according to Example B1 and B7 ratio (ratio 90:10 by wt.) | 46.1 |
| Crosslinking agent solution according to Example A3 | 16.4 |
| Solvent mixture as per the enamel solution used | 7.0 |
| White pigment (TiO$_2$) | 29.4 |
| Defoaming agent | 1.0 |
| Leveling agent | 0.1 |

TABLE 8

| Curing Conditions Time/Temp min/°C. | HK[a] | HB[b] | ET[c] | T-Bend-Test | Pencil Lead Hardness | GS[d] | Gardner Gloss[e] 20° | 60° |
|---|---|---|---|---|---|---|---|---|
| 2.25/280 | 187 | 125 | 8.1 | 0 | 2 H | 0 | 72 | 88 |
| 3/250 | 190 | 125 | 8.4 | 0-1 | 2 H | 0 | 70 | 86 |
| 7/200 | 189 | 125 | 8.30 | 0 | 2 H | 0 | 74 | 90 |
| 10/180 | 186 | 125 | 8.00 | 0 | 2 H | 0 | 73 | 91 |
| 14/170 | 188 | 125 | 8.30 | 0-1 | 2 H | 0 | 70 | 88 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C8

Following preparation of the stock solution according to (Ca) and subsequent pigmentation according to (Cd), the enamel was applied and was cured at a temperature between 170° and 280° C.

Formula (quantities are in wt.%):

| | |
|---|---|
| Polyester solution according to Example B1 | 45.5 |
| Crosslinking agent solution according to Example A4 | 19.5 |
| Solvent mixture as per the enamel solution used | 12.0 |
| White pigment (TiO$_2$) | 27.9 |
| Defoaming agent | 1.0 |
| Leveling agent | 0.1 |

TABLE 9

| Curing Conditions Time/Temp min/°C. | HK[a] | HB[b] | ET[c] | T-Bend-Test | Pencil Lead Hardness | GS[d] | Gardner Gloss[e] 20° | 60° |
|---|---|---|---|---|---|---|---|---|
| 1/280 | 188 | 111 | 7.8 | 0 | 2 H | 0 | 84 | 91 |
| 2/250 | 191 | 111 | 8.1 | 0 | 2 H | 0 | 87 | 94 |
| 4/200 | 189 | 111 | 8.3 | 0-1 | 2 H | 0 | 86 | 93 |
| 8/180 | 187 | 111 | 8.0 | 0 | 2 H | 0 | 83 | 92 |
| 12/170 | 186 | 111 | 7.9 | 0 | 2 H | 0 | 89 | 94 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C9

Following preparation of the stock solution according to (Ca) and subsequent pigmentation according to (Cd), the enamel was applied and was cured at a temperature between 170° and 280° C.

Formula (quantities are in wt.%):

| | |
|---|---|
| Polyester solution according to Example B3 | 49.8 |
| Crosslinking agent solution according to Example A5 | 12.7 |
| Solvent mixture as per the enamel solution used | 7.0 |
| White pigment (TiO$_2$) | 29.4 |
| Defoaming agent | 1.0 |
| Leveling agent | 0.1 |

TABLE 10

| Curing Conditions Time/Temp min/°C. | HK[a] | HB[b] | ET[c] | T-Bend-Test | Pencil Lead Hardness | GS[d] | Gardner Gloss[e] 20° | 60° |
|---|---|---|---|---|---|---|---|---|
| 2.25/280 | 168 | 111 | 8.1 | 0 | 2-2 H | 0 | 70 | 86 |
| 3/250 | 165 | 111 | 8.3 | 0 | H | 0 | 72 | 86 |
| 7/200 | 166 | 111 | 8.0 | 0 | H | 0 | 71 | 87 |
| 10/180 | 165 | 111 | 8.1 | 0 | H | 0 | 72 | 86 |
| 14/170 | 164 | 111 | 8.2 | 0 | H | 0 | 74 | 89 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C10

Following preparation of the stock solution according to (Ca) and subsequent pigmentation according to (Cb), the enamel was applied and was cured at a temperature between 170° and 280° C.

Formula (quantities are in wt.%):

| | |
|---|---|
| Polyester solution according to Example B4 | 50.3 |
| Crosslinking agent solution according to Example A5 | 12.2 |
| Solvent mixture as per the enamel solution used | 7.0 |
| White pigment (TiO$_2$) | 29.4 |
| Defoaming agent | 1.0 |
| Leveling agent | 0.1 |

TABLE 11

| Curing Conditions Time/Temp min/°C. | Mechanical Data | | | | | | | |
|---|---|---|---|---|---|---|---|---|
| | HK[a] | HB[b] | ET[c] | T-Bend-Test | Pencil Lead Hardness | GS[d] | Gardner Gloss[e] 20° | 60° |
| 2.25/280 | 172 | 111 | 8.2 | 0 | H-2 H | 0 | 72 | 86 |
| 3/250 | 177 | 125 | 8.0 | 0 | H | 0 | 71 | 87 |
| 7/200 | 175 | 111 | 8.4 | 0 | H-2 H | 0 | 74 | 89 |
| 10/180 | 172 | 111 | 8.0 | 0 | H-2 H | 0 | 73 | 88 |
| 14/170 | 173 | 111 | 8.3 | 0 | H-2 H | 0 | 75 | 90 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C11

Following preparation of the stock solution according to (Ca) and subsequent pigmentation according to (Cb), the enamel was applied and was cured at a temperature between 170° and 280° C.

Formula (quantities are in wt. %):

| | |
|---|---|
| Polyester solution according to Example B4 | 61.5 |
| Crosslinking agent solution according to Example A6 | 13.5 |
| White pigment (TiO$_2$) | 29.4 |
| Defoaming agent | 1.0 |
| Leveling agent | 0.1 |

TABLE 12

| Curing Conditions Time/Temp min/°C. | Mechanical Data | | | | | | | |
|---|---|---|---|---|---|---|---|---|
| | HK[a] | HB[b] | ET[c] | T-Bend-Tesh | Pencil Lead Hardness | GS[d] | Gardner Gloss 20° | 60° |
| 1/280 | 170 | 125 | 8.1 | 0 | 2 H | 0 | 73 | 84 |
| 2/250 | 173 | 125 | 8.4 | 0 | 2 H | 0 | 72 | 84 |
| 4/200 | 174 | 125 | 8.0 | 0 | H-2 H | 0 | 74 | 86 |
| 8/180 | 172 | 125 | 8.0 | 0 | H-2 H | 0 | 75 | 88 |
| 12/170 | 171 | 125 | 8.2 | 0 | 2 H | 0 | 73 | 86 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C12

Following preparation of the stock solution according to (Ca) and subsequent pigmentation according to (Cb), the enamel was applied and was cured at a temperature between 170° and 280° C.

Formula (quantities are in wt.%):

| | |
|---|---|
| Polyester solution according to Example B5 | 47.3 |
| Crosslinking agent solution according to Example A6 | 11.7 |
| Solvent mixture as per the enamel solution used | 12.0 |
| White pigment (TiO$_2$) | 27.9 |
| Defoaming agent | 1.0 |
| Leveling agent | 0.1 |

TABLE 13

| Curing Conditions Time/Temp min/°C. | Mechanical Data | | | | | | | |
|---|---|---|---|---|---|---|---|---|
| | HK[a] | HB[b] | ET[c] | T-Bend-Test | Pencil Lead Hardness | GS[d] | Gardner Gloss 20° | 60° |
| 1/280 | 168 | 111 | 8.0 | 0 | H-2 H | 0 | 74 | 89 |
| 2/250 | 166 | 100 | 8.2 | 0-1 | H | 0 | 77 | 81 |
| 4/200 | 165 | 111 | 8.1 | 0-1 | H | 0 | 76 | 88 |
| 8/180 | 167 | 111 | 8.1 | 0 | H-2 H | 0 | 75 | 87 |
| 12/170 | 166 | 111 | 8.3 | 0-1 | H | 0 | 76 | 89 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C13

Following preparation of the stock solution according to (Ca) and subsequent pigmentation according to (Cb), the enamel was applied and was cured at a temperature between 170° and 280° C.

Formula (quantities are in wt.%):

| | |
|---|---|
| Polyester solution according to Example B3 | 49.7 |
| Crosslinking agent solution according to Example A7 | 12.8 |
| Solvent mixture as per the enamel solution used | 7.0 |
| White pigment (TiO$_2$) | 29.4 |
| Defoaming agent | 1.0 |
| Leveling agent | 0.1 |

TABLE 14

| Curing Conditions Time/Temp min/°C. | Mechanical Data | | | | | | Gardner Gloss | |
|---|---|---|---|---|---|---|---|---|
| | HK[a] | HB[b] | ET[c] | T-Bend-Test | Pencil Lead Hardness | GS[d] | 20° | 60° |
| 2.25/280 | 168 | 100 | 8.4 | 0 | 2 H | 0 | 68 | 85 |
| 3/250 | 167 | 111 | 8.3 | 0 | H-2 H | 0 | 70 | 85 |
| 7/200 | 166 | 111 | 8.0 | 0 | 2 H | 0 | 74 | 87 |
| 10/180 | 165 | 111 | 8.2 | 0 | H-2 H | 0 | 72 | 86 |
| 14/170 | 167 | 100 | 8.3 | 0 | 2 H | 0 | 70 | 85 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C14

Following preparation of the stock solution according to (Ca) and subsequent pigmentation according to (Cb), the enamel was applied and was cured at a temperature between 170° and 280° C.

Formula (quantities are in wt.%):

| | |
|---|---|
| Polyester solution according to Example B4 | 50.2 |
| Crosslinking agent solution according to Example A7 | 12.3 |
| Solvent mixture as per the enamel solution used | 7.0 |
| White pigment (TiO$_2$) | 29.4 |
| Defoaming agent | 1.0 |
| Leveling agent | 0.1 |

TABLE 15

| Curing Conditions Time/Temp min/°C. | Mechanical Data | | | | | | Gardner Gloss | |
|---|---|---|---|---|---|---|---|---|
| | HK[a] | HB[b] | ET[c] | T-Bend-Test | Pencil Lead Hardness | GS[d] | 20° | 60° |
| 2.25/280 | 179 | 111 | 8.4 | 0 | 2 H | 0 | 71 | 88 |
| 3/250 | 177 | 125 | 8.3 | 0 | 2 H | 0 | 74 | 90 |
| 7/200 | 179 | 111 | 8.3 | 0 | 2 H | 0 | 72 | 87 |
| 10/180 | 176 | 111 | 8.4 | 0 | 2 H | 0 | 73 | 88 |
| 14/170 | 177 | 111 | 8.2 | 0 | 2 H | 0 | 73 | 90 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C15

Following preparation of the stock solution according to (Ca) and subsequent pigmentation according to (Cb), the enamel was applied and was cured at a temperature between 170° and 280° C.

Formula (quantities are in wt.%):

| | |
|---|---|
| Polyester solution according to Example B5 | 49.2 |
| Crosslinking agent solution according to Example A7 | 13.3 |
| Solvent mixture as per the enamel solution used | 7.0 |
| White pigment (TiO$_2$) | 29.4 |
| Defoaming agent | 1.0 |
| Leveling agent | 0.1 |

TABLE 16

| Curing Conditions Time/Temp min/°C. | Mechanical Data | | | | | | Gardner Gloss | |
|---|---|---|---|---|---|---|---|---|
| | HK[a] | HB[b] | ET[c] | T-Bend-Test | Pencil Lead Hardness | GS[d] | 20° | 60° |
| 2.25/280 | 167 | 111 | 8.2 | 0 | H-2 H | 0 | 72 | 87 |
| 3/250 | 169 | 111 | 8.4 | 0-1 | 2 H | 0 | 76 | 89 |
| 7/200 | 170 | 100 | 8.1 | 0 | 2 H | 0 | 71 | 88 |
| 10/180 | 167 | 100 | 8.2 | 0 | H-2 H | 0 | 77 | 91 |
| 14/170 | 168 | 111 | 8.0 | 0-1 | 2 H | 0 | 76 | 90 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C16

Following preparation of the stock solution according to (Ca) and subsequent pigmentation according to (Cb), the enamel was applied and was cured at a temperature between 170° and 280° C.

Formula (quantities are in wt.%):

| | |
|---|---|
| Polyester solution according to Example B4 | 47.6 |
| Crosslinking agent soluiion according to Example A3 | 11.4 |
| Solvent mixture as per the enamel solution used | 12.0 |
| White pigment (TiO$_2$) | 27.9 |
| Defoaming agent | 1.0 |
| Leveling agent | 0.1 |

TABLE 17

| Curing Conditions Time/Temp min/°C. | HK[a] | HB[b] | ET[c] | T-Bend-Test | Pencil Lead Hardness | GS[d] | Gardner Gloss 20° | 60° |
|---|---|---|---|---|---|---|---|---|
| 1/280 | 184 | 111 | 8.6 | 0 | 2 H | 0 | 72 | 86 |
| 2/250 | 182 | 125 | 8.3 | 0–1 | 2 H | 0 | 74 | 86 |
| 4/200 | 186 | 111 | 8.5 | 0 | 2 H | 0 | 80 | 89 |
| 8/180 | 180 | 111 | 8.4 | 0–1 | 2 H | 0 | 80 | 90 |
| 12/170 | 181 | 111 | 8.5 | 0–1 | 2 H | 0 | 76 | 87 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C17

Following preparation of the stock solution according to (Ca) and subsequent pigmentation according to (Cb), the enamel was applied and was cured at a temperature between 170° and 280° C.

Formula (quantities are in wt.%):

| | |
|---|---|
| Polyester solution according to Example B5 | 46.9 |
| Crosslinking agent solution according to Example A8 | 12.1 |
| Solvent mixture as per the enamel solution used | 12.0 |
| White pigment (TiO$_2$) | 27.9 |
| Defoaming agent | 1.0 |
| Leveling agent | 0.1 |

TABLE 18

| Curing Conditions Time/Temp min/°C. | HK[a] | HB[b] | ET[c] | T-Bend-Test | Pencil Lead Hardness | GS[d] | Gardner Gloss 20° | 60° |
|---|---|---|---|---|---|---|---|---|
| 1/280 | 169 | 100 | 8.0 | 0–1 | H | 0 | 74 | 88 |
| 2/250 | 171 | 111 | 8.3 | 0 | H-2 H | 0 | 72 | 87 |
| 4/200 | 168 | 100 | 8.1 | 0–1 | H | 0 | 75 | 90 |
| 8/180 | 167 | 100 | 8.0 | 0–1 | H | 0 | 74 | 89 |
| 12/170 | 168 | 100 | 8.2 | 0 | H | 0 | 76 | 91 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C18

Following preparation of the stock solution according to (Ca) and subsequent pigmentation according to (Cb), the enamel was applied and was cured at a temperature between 170° and 280° C.

Formula (quantities are in wt.%):

| | |
|---|---|
| Polyester solution according to Example B1 | 48.3 |
| Crosslinking agent solution according to Example A1 | 14.2 |
| Solvent mixture as per the enamel solution used | 7.0 |
| White pigment (TiO$_2$) | 29.4 |
| Defoaming agent | 1.0 |
| Leveling agent | 0.1 |

TABLE 19

| Curing Conditions Time/Temp min/°C. | HK[a] | HB[b] | ET[c] | T-Bend-Test | Pencil Lead Hardness | GS[d] | Gardner Gloss[e] 20° | 60° |
|---|---|---|---|---|---|---|---|---|
| 2.25/280 | 190 | 125 | 7.9 | 1 | 2 H | 0 | 70 | 86 |
| 3/250 | 189 | 125 | 8.2 | 0–1 | 2 H | 0 | 68 | 86 |
| 7/200 | 193 | 125 | 7.8 | 1 | 2 H–3 H | 0 | 72 | 87 |
| 10/180 | 193 | 125 | 7.7 | 0–1 | 2 H | 0 | 71 | 88 |
| 14/170 | 197 | 125 | 7.8 | 1–2 | 2 H | 0 | 69 | 87 |

[a]Koenig hardness (sec) (DIN 53157)
[b]Buchholz hardness (DIN 53153)
[c]Erichsen cupping (mm) (DIN 53156)
[d]Grid-cutting test (DIN 53151)
[e]ASTM-D523

EXAMPLE C19

Following preparation of the stock solution according to (Ca) and subsequent pigmentation according to (Cb), the enamel was applied and was cured at a temperature between 170° and 280° C.

Formula (quantities are in wt.%):

| | |
|---|---|
| Polyester solution according to Example B1 | 49.5 |
| Crosslinking agent solution according to Example A1 | 13.0 |
| Solvent mixture as per the enamel solution used | 7.0 |
| White pigment (TiO$_2$) | 29.4 |
| Defoaming agent | 1.0 |
| Leveling agent | 0.1 |

TABLE 20

| Curing Conditions Time/Temp min/°C. | HK[a] | HB[b] | ET[c] | T-Bend-Test | Pencil Lead Hardness | GS[d] | Gardner Gloss 20° | 60° |
|---|---|---|---|---|---|---|---|---|
| 2.25/280 | 183 | 125 | 8.2 | 0–1 | 2 H | 0 | 66 | 82 |
| 3/250 | 184 | 125 | 8.2 | 0 | 2 H | 0 | 67 | 84 |
| 7/200 | 186 | 125 | 8.0 | 0–1 | 2 H | 0 | 65 | 87 |
| 10/180 | 185 | 125 | 7.9 | 0–1 | 2 H | 0 | 63 | 86 |
| 14/170 | 182 | 125 | 8.0 | 0–1 | 2 H | 0 | 64 | 89 |

[a] Koenig hardness (sec) (DIN 53157)
[b] Buchholz hardness (DIN 53153)
[c] Erichsen cupping (mm) (DIN 53156)
[d] Grid-cutting test (DIN 53151)
[e] ASTM-D523

EXAMPLE C20

Following preparation of the stock solution according to (Ca) and subsequent pigmentation according to (Cb), the enamel was applied and was cured at a temperature between 170° and 280° C.

Formula (quantities are in wt.%):

| | |
|---|---|
| Polyester solution according to Example B1 | 52.2 |
| Crosslinking agent solution according to Example A1 | 10.3 |
| Solvent mixture as per the enamel solution used | 7.0 |
| White pigment (TiO$_2$) | 29.4 |
| Defoaming agent | 1.0 |
| Leveling agent | 0.1 |

TABLE 21

| Curing Conditions Time/Temp min/°C. | HK[a] | HB[b] | ET[c] | T-Bend-Test | Pencil Lead Hardness | GS[d] | Gardner Gloss[e] 20° | 60° |
|---|---|---|---|---|---|---|---|---|
| 2.25/280 | 184 | 125 | 8.2 | 1 | 2 H | 0 | 62 | 85 |
| 3/250 | 182 | 125 | 8.4 | 1–2 | 2 H | 0 | 64 | 85 |
| 7/200 | 182 | 125 | 8.2 | 1 | 2 H | 0 | 70 | 88 |
| 10/180 | 184 | 125 | 8.1 | 1 | 2 H | 0 | 64 | 85 |
| 14/170 | 181 | 125 | 8.0 | 1 | 2 H | 0 | 67 | 86 |

[a] Koenig hardness (sec) (DIN 53157)
[b] Buchholz hardness (DIN 53153)
[c] Erichsen cupping (mm) (DIN 53156)
[d] Grid-cutting test (DIN 53151)
[e] ASTM-D523

D. COMPARATIVE EXAMPLES

I. GENERAL METHOD OF PREPARATION

The preparation of partially blocked polyisocyanates without thin layer distillation:

At 90°–110° C., 1 mole blocking agent is added to 1 mole polyisocyanate in such a way that the temperature of the reaction mixture does not rise above 120° C. After completion of the addition of the blocking agent, the mixture is heated until the NCO content reaches the calculated value. The chemical and physical parameters of the reaction products are summarized in the following Table 22.

TABLE 22

| | Starting Material | | Polyisocyanate | | | | | | | |
|---|---|---|---|---|---|---|---|---|---|---|
| Example | Polyisocyanate | Blocking Agent | NCO-Content in wt. % free | total | monomer wt % | Viscosity in mPa.s at °C. 25° C. | 30° C. | 40° C. | 50° C. | 70° C. |
| DI-1 | IPDI | Caprol. | 12.4 | 24.85 | 15.8 | 381000 | 142000 | 27800 | 6650 | 690 |
| DI-2 | IPDI | MEK-ox | 12.4 | 26.0 | 15.3 | 27000 | 14750 | 3390 | 1100 | 195 |
| DI-3 | HDI | Caprol. | 14.7 | 29.75 | 14.5 | 90 | 70 | 60 | 40 | <30 |
| DI-4 | HDI | MEK-ox | 16.4 | 31.5 | 14.5 | 75 | 55 | 35 | 30 | <30 |
| DI-5 | DI51 | Caprol. | 14.5 | 29.0 | 14.3 | 190 | 140 | 70 | 40 | <30 |
| DI-6 | DI51 | MEK-ox | 16.2 | 31.7 | 17.7 | 110 | 85 | 45 | 30 | <30 |
| DI-7 | HMDI | Caprol. | 10.9 | 21.9 | 17.0 | 880000 | 300000 | 60000 | 9000 | 110 |

For manufacturing the single-component PUR baking enamels, the partially blocked polyisocyanates were dissolved in various enamel solvent combinations, and the drainage times of 60% solutions in a DIN 4 beaker were determined. These times were between 6 and 25 sec.

II. COMPARISON EXAMPLES OF ENAMELS

The single-component PUR baking enamels prepared from the polyisocyanates of the DI examples in Table 22 above and the hydroxyl group-containing polyesters according to B are representative of the conventional enamels. The high viscosities of the enamel stock solutions require large quantities of solvent to be usable. This represents an environmental pollution load. Further, because of the high degree of precrosslinking, which occurs as a result of the high content of unblocked polyisocyanates in the polyisocyanates used (which latter are not subjected to thin layer distillation), gel formation can occur, with substantial detriment to the quality (flowability) of the enamel.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method of manufacturing a single-component PUR baking enamel comprising:
   preparing a binder which is the reaction product of a partially blocked polyisocyanate (A) having a free NCO content >10 wt% and a total NCO content of 21–37 wt.% and a hydroxyl group-containing polyhydroxy compound having more than two hydroxy groups per molecule; and
   combining the reaction product with baking enamel additives in a solvent employable for baking enamels.

2. The method according to claim 1, wherein the partially blocked polyisocyanate is obtained by adding a blocking agent to a 5–20-fold molar amount of polyisocyanate, wherewith the boiling point of the polyisocyanate in vacuo is lower than the de-blocking temperature of the blocking agent.

3. The method of claim 1, wherein any un-blocked polyisocyanate present with said partially blocked polyisocyanate is substantially completely removed by thin layer evaporation, thereby reducing the content of the un-blocked polyisocyanate to ≦3.5 wt.%.

4. The method of claim 3, wherein the reduced content of un-blocked polyisocyanate is ≦2.5 wt.%.

5. The method of claim 4, wherein the reduced content of un-blocked polyisocyanate is ≦1 wt.%.

6. The method of claim 1, wherein said polyisocyanate is an aliphatic and/or cycloaliphatic diisocyanate.

7. The method of claim 6, wherein said diisocyanate is 1,6-hexanediisocyanate, 2-methyl-1,5-pentanediisocyanate, or 2,2,4- and/or 2,4,4-trimethyl-1,6-hexanediisocyanate.

8. The method of claim 6, wherein the diisocyanate is 3-isocyanatomethyl-3,5,5-trimethylcyclohexylisocyanate.

9. The method of claim 1, wherein the hydroxyl group-containing polyhydroxy compound is a saturated polyester formed by the reaction of an aliphatic and/or aromatic polycarboxylic acid with a diol or a triol, said polyhydroxy compound having a hydroxyl number of 50–400 mg KOH/g a molecular weight of 400–4500 and a glass temperature <+20° C.

10. The method of claim 9, wherein the polyhydroxy compound has a hydroxyl number of 80–330 mg KOH/g and a molecular weight of 500–2500.

11. The method of claim 1, wherein the OH/NCO ratio of the reactants ranges from 1:0.6 to 1:1.2.

12. The method of claim 11, wherein said OH/NCO ratio ranges from 1:0,8 to 1:1,1.

13. The method of claim 12, wherein said OH/NCO ratio is 1:1.

14. The method of claim 1, wherein the binder is comprised of hydroxyl group-containing polyesters in the amount of 50–90 wt.% and the partially blocked polyisocyanate in the amount of 50–10 wt.%.

15. The method of claim 1, wherein the binder is prepared by the reaction between polyhydroxy compounds and polyisocyanates promoted by a catalyst in an amount of 0.05–1.5 wt.%.

16. The method of claim 15, wherein said catalyst is present in an amount of 0.1 to 0.5 wt.%.

17. The method of claim 1, wherein the enamel produced contains pigments and/or fillers in amounts of up to 50 wt.%.

18. A single-component PUR baking enamel prepared by the process described in claim 1.

* * * * *